(12) United States Patent
Romanetto et al.

(10) Patent No.: US 11,535,056 B2
(45) Date of Patent: Dec. 27, 2022

(54) WHEEL HUB WITH CENTRING MEANS

(71) Applicant: Aktiebolaget SKF, Gothenburg (SE)

(72) Inventors: Marco Romanetto, Pianezza (IT); Luca Donetti, Turin (IT); Dario Ricci, Turin (IT); Antonio Ruiu, Collegno (IT)

(73) Assignee: AKTIEBOLAGET SKF

( * ) Notice: Subject to any disclaimer, the term of this patent is extended or adjusted under 35 U.S.C. 154(b) by 567 days.

(21) Appl. No.: 16/423,323

(22) Filed: May 28, 2019

(65) Prior Publication Data

US 2019/0381825 A1   Dec. 19, 2019

(30) Foreign Application Priority Data

Jun. 15, 2018   (IT) .......................... 102018000006325

(51) Int. Cl.
   B60B 27/00   (2006.01)

(52) U.S. Cl.
   CPC ........ B60B 27/0052 (2013.01); B60B 27/001 (2013.01); *B60B 2380/14* (2013.01)

(58) Field of Classification Search
   CPC ... B60B 27/00; B60B 27/0052; B60B 27/001; B60B 2380/14; B60B 27/0005; B60B 27/0078; B60B 3/14; B60B 3/147
   USPC .................................................... 301/35.627
   See application file for complete search history.

(56) References Cited

U.S. PATENT DOCUMENTS

| | | | |
|---|---|---|---|
| 6,612,657 | B1 | 9/2003 | Fakhoury et al. |
| 7,111,911 | B2* | 9/2006 | Baumgartner ........ F16D 65/123 188/218 XL |
| 7,393,064 | B2* | 7/2008 | Hall ...................... B60B 27/00 29/527.6 |
| 7,942,585 | B2 | 5/2011 | Hirai et al. |
| 8,568,036 | B2 | 10/2013 | Torii |
| 9,676,232 | B2 | 6/2017 | Niebling et al. |
| 2011/0209562 | A1 | 9/2011 | Ono et al. |
| 2021/0001664 | A1* | 1/2021 | Albl ...................... B60B 27/02 |

FOREIGN PATENT DOCUMENTS

| | | |
|---|---|---|
| CN | 204020411 | 12/2014 |
| DE | 102009015950 | 9/2010 |
| DE | 112008002882 | 9/2010 |
| DE | 102012213527 | 2/2014 |
| DE | 102012219903 | 4/2014 |

(Continued)

OTHER PUBLICATIONS

International Search Report for corresponding Italy Patent Application No. 201800006325 dated Feb. 22, 2019.

*Primary Examiner* — Kip T Kotter
(74) *Attorney, Agent, or Firm* — Reed Smith LLP

(57) ABSTRACT

A wheel hub having an axis of symmetry and including a flange transverse to the axis of symmetry and provided with a plurality of fixing holes for attaching a wheel, a tubular body extending axially from the flange for supporting a rolling bearing, and a centering device arranged on a side of the flange opposite to that of the tubular body and in a position concentric with the axis of symmetry of the wheel hub, for retaining a wheel rim or a brake disc. The centering device being provided with a given number of flattened areas extending circumferentially and axially on a respective continuous tubular body projecting axially from the flange.

6 Claims, 2 Drawing Sheets

(56) References Cited

FOREIGN PATENT DOCUMENTS

| | | | | |
|---|---|---|---|---|
| EP | 2505380 | | 10/2012 | |
| JP | 2006273246 | | 10/2006 | |
| JP | 2017190865 A | * | 10/2017 | ......... B60B 27/0078 |

* cited by examiner

WHEEL HUB WITH CENTRING MEANS

CROSS-REFERENCE TO RELATED APPLICATIONS

This application claims priority to Italian patent application no. 102018000006325 filed on Jun. 15, 2018, the contents of which are fully incorporated herein by reference.

FIELD OF THE INVENTION

The present invention relates to a wheel hub with centring means forming part of a wheel hub unit. The present invention is suitable in particular, even though not exclusively, for wheel hub units of motor vehicles for mounting a vehicle wheel on a pillar connected to the vehicle.

BACKGROUND OF THE INVENTION

The German patent DE102009015950A1 discloses a wheel hub unit having an axis of symmetry and comprising:
- a flange transverse to the axis of symmetry and provided with a plurality of fixing holes for attaching a wheel;
- a tubular body extending axially from the flange for supporting a rolling bearing; and
- a centring device arranged on a side of the flange opposite to that of the tubular body and in a position concentric with the axis of symmetry of the wheel hub, for retaining a wheel rim or a brake disc.

In the known wheel hub described above, the centring device is formed, also for the purposes of reducing the weight of the wheel hub, by connecting parts which are separated from each other in a peripheral direction by recesses. However, the centring device thus structured poses not only production-related problems, since the machining of the connecting parts is relatively complex, but also structural problems, since critical zones may be formed in the flange in the region of the recesses.

SUMMARY OF THE INVENTION

The object of the present invention is to provide a wheel hub with centring means which, while maintaining a low weight, does not have the aforementioned drawbacks.

According to the present invention a wheel hub with centring means having the characteristic features indicated in the attached claims is provided.

BRIEF DESCRIPTION OF THE SEVERAL VIEWS OF THE DRAWING

The invention will now be described with reference to the accompanying drawings which illustrate a non-limiting example of embodiment thereof, in which.

DETAILED DESCRIPTION OF THE INVENTION

Figure 1:
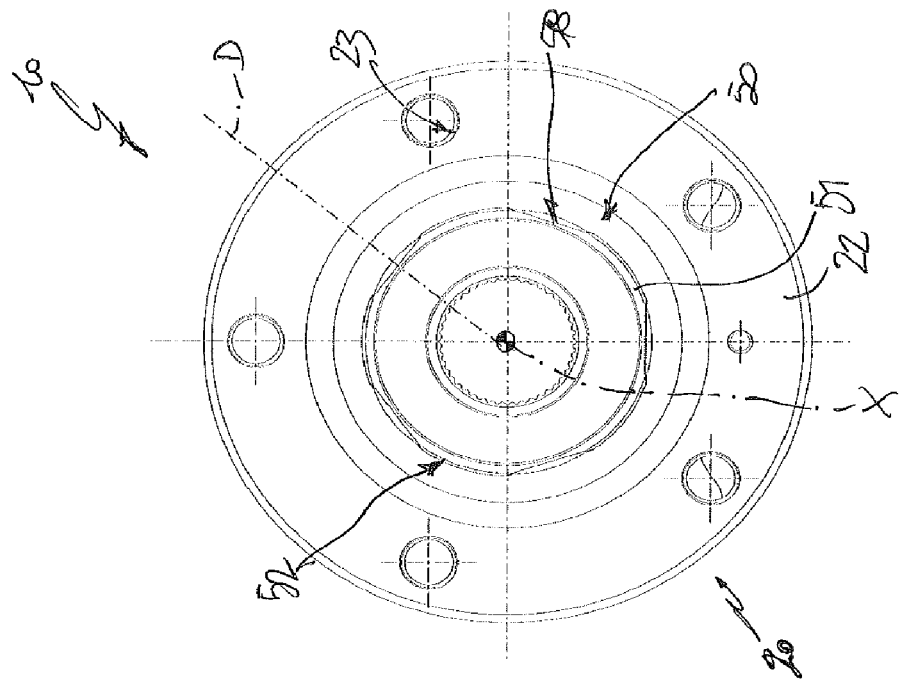
FIG. 1 is a perspective view of a preferred embodiment of the wheel hub according to the present invention.

With reference to FIG. 1, 10 denotes in its entirety a wheel hub unit according to a preferred embodiment of the invention.

The unit 10 has an axis X of symmetry or rotation and comprises a wheel hub 20 configured to assume also the function of an inner rolling ring of the unit 10 and, for this reason, is likewise referred to as a flanged inner ring. The wheel hub unit 10 allows the assembly of a vehicle wheel (known and not shown) and of the associated disc brake (known and not shown), on a pillar (known and not shown) connected to the vehicle, allowing the rotation of the wheel about the axis X and with respect to the pillar.

In the whole of the present description and the claims, the terms and expressions indicating positions and orientations such as "radial" and "axial" are understood as referring to the central axis X of rotation of the unit 10. Expressions such as "axially outer" and "axially inner" refer instead to the assembled condition and, in the specific case, preferably refer to a wheel side, namely a side of the unit 10 directed towards the wheel or towards the outside of the vehicle, and respectively to a side opposite to the wheel side, namely a side of the unit 10 directed towards the inside of the vehicle.

Figure 2:
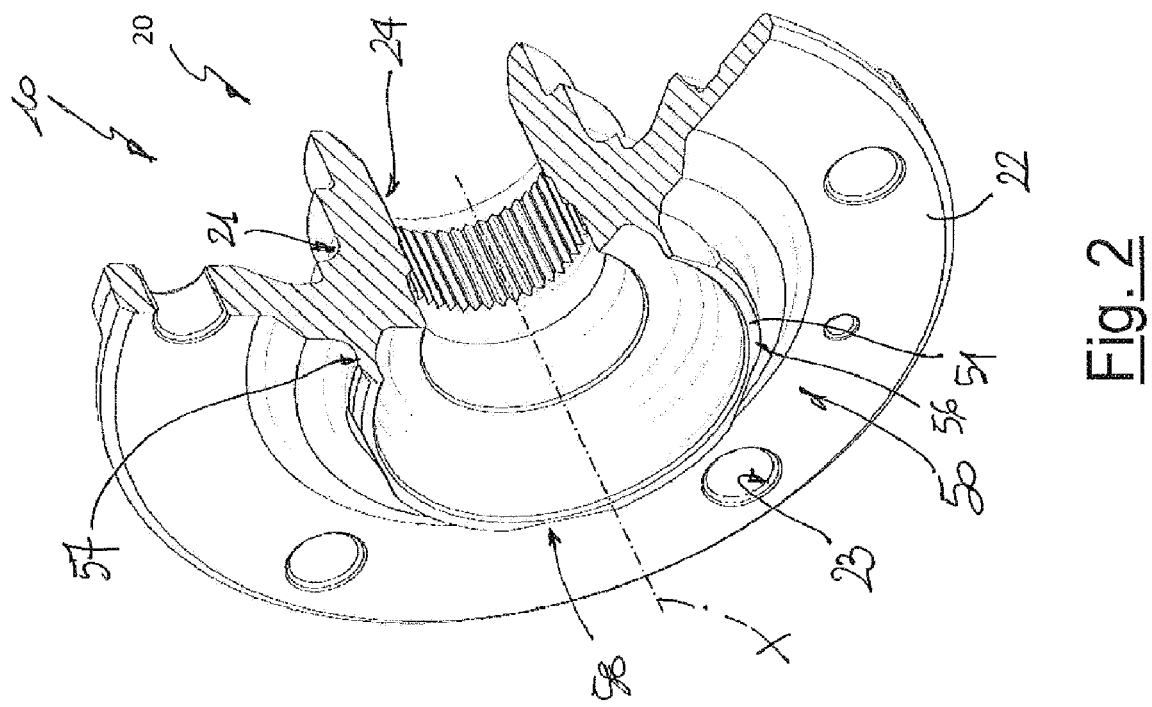
FIG. 2 is a perspective view, on a smaller scale, with parts cross-sectioned and parts removed for greater clarity, of the wheel hub according to FIG. 1.

As shown also in FIG. 2, the wheel hub unit 10 for motor vehicles comprises:
- an outer ring 30, which is preferably flanged for connecting the unit 10 to the pillar and is provided with respective raceways (known and not shown), similar to a raceway 21 with which the wheel hub 20 is also provided; and
- a plurality of rolling bodies (known and not shown) positioned between the inner ring or wheel hub 20 and the outer ring 30.

The assembly consisting of the two rings, i.e. inner ring 20 and outer ring 30, with the rolling bodies (known and not shown), forms a rolling bearing 40 forming part of the wheel hub unit 10 for allowing relative rotation of a wheel (known and not shown) fixed to the inner ring or wheel hub, relative to the pillar (known and not shown) of the vehicle.

In the example of embodiment of the present invention, the wheel hub 20 also comprises:
- a flange 22 transverse to the axis X of symmetry and provided with a plurality of fixing holes 23 for attaching the wheel;
- a tubular body 24 extending axially from the flange 22 for supporting the rolling bearing 40; and
- a centring device 50, which is arranged on a side of the flange 22 opposite to that of the tubular body 24 and in a position concentric with the axis X of symmetry of the wheel hub 20, for retaining a wheel rim (known and not shown) forming part of the wheel and/or a brake disc (known and not shown).

Figure 4:
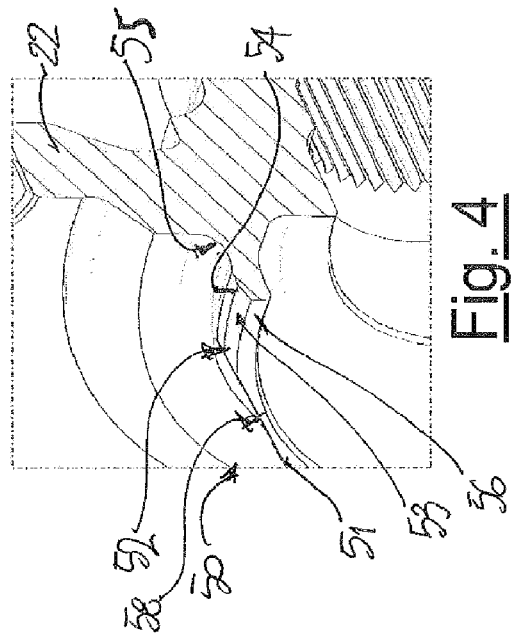
FIGS. 4 and 5 are views, on a larger scale, of two details of the wheel hub according to FIG. 2.
Figure 5:
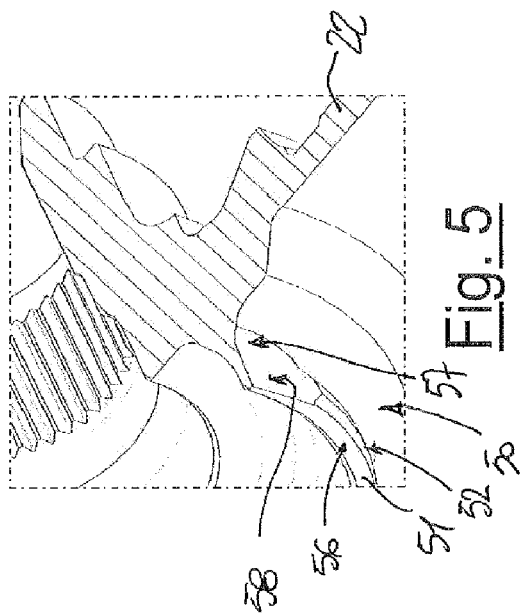

The centering device 50 allows both centering of the wheel rim and the brake disc with respect to the axis X and mounting of the wheel rim and the brake disc on the wheel hub unit 10 and comprises a continuous tubular body 51 projecting axially from the flange 22 and radially bounded outwards by a cylindrical outer mounting surface 52 which, as in the detail shown in FIGS. 4 and 5, is substantially defined by three different portions 53, 54, and 55 which are arranged in series starting from a free inner edge 56 of the tubular body 51 and where:
- the portion 53 is a conical receiving portion for mounting the wheel rim and the brake disc on the wheel hub unit 10 and is tapered outwards and towards the free outer edge 56 of the wheel hub unit 10;
- the portion 55 is a concave transition portion between the tubular body 51 and the flange 22 for reducing any local tension and allowing better distribution of the tension, preventing the formation of cracks and fissures which would result in a reduction of the working life of the wheel hub unit 10; and the portion 54 is bounded radially by the surface 52, is an intermediate cylindrical portion situated between the portions 53 and 55 and has an outer diameter with dimensions greater than both the dimensions of an outer diameter of the free outer edge 56 and a cylindrical end surface 57 of the portion 55.

Figure 3:
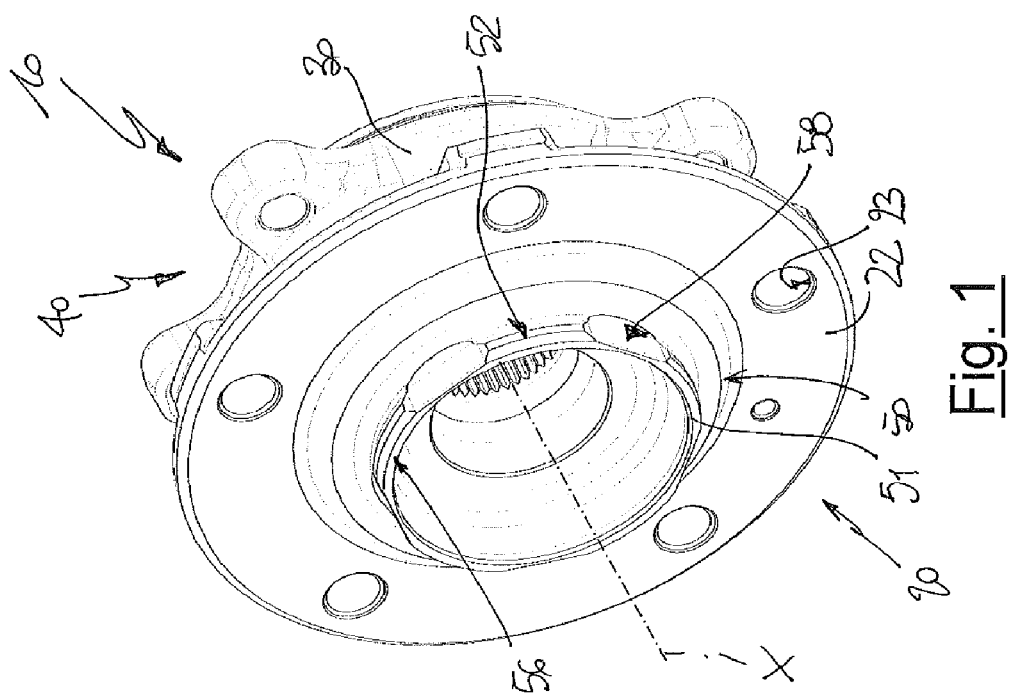
FIG. 3 is a front view, on a smaller scale, of the wheel hub according to FIG. 1.

In particular, as also shown in FIG. 3, still with the aim of reducing the weight of the structure of the wheel hub 20 and the associated wheel hub unit 10, but also, as will be described below, with the aim of adding a further function necessary for solving a technical problem which particularly affects the current wheel hub units, the centring device 50 is provided with a given number of flattened areas 58 which are uniformly distributed around the axis X and extend circumferentially on the tubular body 51 and, axially from the outer edge 56, on the outer surface 52.

The flattened areas 58 are arranged perpendicularly with respect to directrix D passing through the axis X of symmetry of the wheel hub 20 and interferes radially both with the conical receiving portion 53 extending from the free outer edge 56 and with the intermediate cylindrical portion 54, resulting in a reduction of a radial thickness of both the portions 53 and 54; moreover, the flattened areas 58 are arranged substantially continuously with the cylindrical end surface 57 of the portion 55.

When a brake disc and a wheel rim are mounted axially next to the flange 22 and are centered with respect to the axis X by the centring device 50 owing to the cooperation between the inner edges of the mounting holes (not shown) of the brake disc and the wheel rim with the intermediate cylindrical portion 54, the necessary configuration of the transition portion 55 would cause—as occurs in wheel hub units and in wheel hubs of the known type—a gradual and undesirable accumulation of water within a volume defined by the brake disc, the wheel rim and the continuous tubular body 51. Instead, owing to the present invention, namely owing to the above-described novel configuration of the centring device 50 of the wheel hub 20, and in particular owing to the presence of the flattened areas 58, actual drainage zones formed by the flattened areas 58 are created between the inner edges of the mounting holes (not shown) of the brake disc and the continuous tubular body 51, these allowing any water which has accumulated to flow out.

In the example of embodiment shown here, the flattened areas 58 are five in number, and the fixing holes 23 are likewise of the same number. However, since the flattened areas 58 influence both the weight of the wheel hub unit 10, namely of the wheel hub 20 itself, and the strength of the continuous tubular body 51, their number may also vary depending on the dimensions of the continuous tubular body 51 and the results in terms of weight reduction to be achieved, subject, however, to the residual structure strength of the continuous tubular body 51.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A wheel hub having an axis (X) of symmetry and comprising:
    a flange transverse to the axis (X) of symmetry and provided with a plurality of fixing holes for attaching a wheel;
    a tubular body extending axially from the flange for supporting a rolling bearing; and
    a centring device arranged on a side of the flange opposite to that of the tubular body and in a position concentric with the axis of symmetry of the wheel hub, for retaining a wheel rim or a brake disc;
    wherein the centring device further comprises:
        a respective continuous tubular portion projecting axially from the flange, radially bounded by a cylindrical outer mounting surface, and provided with at least one flattened area extending circumferentially and axially on the outer mounting surface;
        a conical receiving portion tapered outwards and towards a free outer edge of the wheel hub;
        a concave transition portion axially between the tubular portion and the flange; and
        an intermediate cylindrical portion axially between the transition portion and the receiving portion.

2. The wheel hub according to claim 1, wherein the flattened areas are arranged perpendicularly with respect to respective directrix (D) passing through the axis (X) of symmetry.

3. The wheel hub according to claim 1, wherein the flattened areas are present in a given number equal to the number of the fixing holes.

4. A wheel hub unit for motor vehicles, comprising:
    a flanged inner ring or wheel hub,
    an outer ring fixed with respect to the flanged inner ring, and wherein
    the flanged inner ring or wheel hub has an axis (X) of symmetry and includes:
        a flange transverse to the axis (X) of symmetry and provided with a plurality of fixing holes for attaching a wheel;
        a tubular body extending axially from the flange for supporting a rolling bearing; and
        a centring device arranged on a side of the flange opposite to that of the tubular body and in a position concentric with the axis of symmetry of the wheel hub, for retaining a wheel rim or a brake disc,
    wherein the centring device further comprises:
        a respective continuous tubular portion projecting axially from the flange, radially bounded by a cylindrical outer mounting surface, and provided with at least one flattened area extending circumferentially and axially on the outer mounting surface;
        a conical receiving portion tapered outwards and towards a free outer edge of the wheel hub;
        a concave transition portion axially between the tubular portion and the flange; and
        an intermediate cylindrical portion axially between the transition portion and the receiving portion.

5. The wheel hub bearing of claim 4, wherein the outer ring is flanged.

6. A centring device for retaining a wheel rim to a wheel hub, the centring device comprising:
    a continuous tubular portion projecting axially from a flange of the wheel hub, radially bounded by a cylindrical outer mounting surface, and provided with at least one flattened area extending circumferentially and
axially on the outer mounting surface;
a conical receiving portion tapered outwards and towards
a free edge of the outer mounting surface;
a concave transition portion axially between the tubular
portion and the flange; and
an intermediate cylindrical portion axially between the
transition portion and the receiving portion.

\* \* \* \* \*